United States Patent
De Gregorio Hurtado et al.

(10) Patent No.: US 9,108,721 B2
(45) Date of Patent: Aug. 18, 2015

(54) TRAILING EDGE OF AN AIRCRAFT AERODYNAMIC SURFACE

(71) Applicant: Airbus Operations, S.L., Getafe (ES)

(72) Inventors: Yolanda De Gregorio Hurtado, Aranjuez (ES); Alberto Balsa Gonzalez, Valdemoro (ES)

(73) Assignee: Airbus Operations, S.L., Getafe (ES)

( * ) Notice: Subject to any disclaimer, the term of this patent is extended or adjusted under 35 U.S.C. 154(b) by 112 days.

(21) Appl. No.: 13/775,471

(22) Filed: Feb. 25, 2013

(65) Prior Publication Data

US 2014/0339370 A1    Nov. 20, 2014

(30) Foreign Application Priority Data

Feb. 29, 2012   (ES) .................................. 201230300

(51) Int. Cl.
| | | |
|---|---|---|
| *B64C 3/28* | (2006.01) | |
| *B64C 5/00* | (2006.01) | |
| *B64C 3/20* | (2006.01) | |
| *B64C 3/14* | (2006.01) | |

(52) U.S. Cl.
CPC ... *B64C 3/28* (2013.01); *B64C 3/20* (2013.01); *B64C 5/00* (2013.01); *B64C 2003/147* (2013.01)

(58) Field of Classification Search
CPC .............. B64C 3/28; B64C 3/20; B64C 5/00; B64C 2003/147
USPC ......................................................... 244/123.1
See application file for complete search history.

(56) References Cited

U.S. PATENT DOCUMENTS

| | | | | |
|---|---|---|---|---|
| 4,079,903 | A * | 3/1978 | Ashton et al. ............... | 244/123.5 |
| 6,102,662 | A * | 8/2000 | Bost et al. ...................... | 416/224 |
| 6,779,757 | B2 * | 8/2004 | Thomas, Jr. ................ | 244/123.1 |
| 7,384,016 | B2 * | 6/2008 | Kota et al. .................... | 244/123.1 |
| 7,871,041 | B2 * | 1/2011 | Brice et al. ................. | 244/123.7 |
| 8,123,167 | B2 * | 2/2012 | Olmi et al. ..................... | 244/121 |
| 8,444,091 | B2 * | 5/2013 | Balsa Gonzalez et al. | 244/123.1 |
| 2004/0000613 | A1 * | 1/2004 | Thomas, Jr. ..................... | 244/10 |
| 2010/0155528 | A1 * | 6/2010 | Balsa Gonzalez et al. ..... | 244/87 |

FOREIGN PATENT DOCUMENTS

WO    WO 2010/070185 A2    6/2010

* cited by examiner

*Primary Examiner* — Justin Benedik

(74) *Attorney, Agent, or Firm* — Oblon, McClelland, Maier & Neustadt, L.L.P.

(57) ABSTRACT

The invention discloses a trailing edge (2) of an aircraft aerodynamic surface, which comprises an upper skin (6) and a lower skin (7), being the upper and lower skins (6, 7) made of composite material. In the trailing edge (2) a lightweight part (1) is assembled at an end section (13) of the upper and lower skins (6, 7). The lightweight part (1) is covered by a metallic sheet (8), and has a "V"-shaped cross section with arms and peak, where the peak of the "V"-shaped cross section has a rounded shape and is located opposite the end section (13) of the upper and lower skins (6, 7).

19 Claims, 4 Drawing Sheets

TRAILING EDGE OF AN AIRCRAFT AERODYNAMIC SURFACE

OBJECT OF THE INVENTION

The present invention discloses a new design of the trailing edge of an aircraft aerodynamic surface, said design is used for the trailing edge of a vertical stabilizer, a rudder, for the trailing edge of a horizontal stabilizer, an elevator, for the trailing edge of a wing, for the trailing edge of a flap and in the trailing edge of an aileron in an aircraft.

BACKGROUND OF THE INVENTION

The skins of an elevator, in Long Range (LR) & Single Aisle (SA) type aircraft, are manufactured with sandwich type composite materials.

Sandwich type composite material skins are manufactured by attaching two thin, but stiff skins (typically made from carbon fibre reinforced plastic laminates) to a lightweight but thick core (usually open and closed-cell structured foams). The core must have a minimum thickness in order to withstand the pressure transferred by the carbon fibre reinforced laminates during the curing cycle wherein a high temperature and pressure is applied; otherwise the core would collapse under said pressure.

Trailing edges of aircraft structures are formed by joining the upper skin and the lower skin of said aircraft structure. The thickness of the upper skin and of the lower skin decreases in the area of the trailing edge, in order to achieve the desired aerodynamic profile.

When the upper skin and the lower skin of said aircraft structure are made of sandwich type composite materials, due to the minimum core thickness requirement for each skin, there is a change in the slope of the upper skin and the lower skin, which worsens the aerodynamic profile of the aforementioned trailing edge.

In order to achieve a continuous aerodynamic profile, the upper and lower skins are currently joined by a clip type metal sheet, with a U-shape and the remaining space is filled with a paste until the desired continuous aerodynamic profile is obtained. This paste, when used in a huge quantity, becomes chapped and falls off the stabilizers, carrying, with the falling off of the paste, the paint of the aircraft. This falling off increases the profile drag and the falling off is an esthetic drawback that is the cause of many complaints from airlines.

Document WO 2010/070185 A2 discloses a trailing edge structure according to the prior art, in which the upper and lower skins are joined by a clip-type element with recesses where the inner surfaces of both the upper skin and the lower skin are coupled to said element, placing a paste on the clip-type element until the aerodynamic desired profile is obtained.

SUMMARY OF THE INVENTION

In order to achieve the aims of the invention and to solve the aforementioned drawbacks, the invention discloses a trailing edge of an aircraft aerodynamic surface where the use of the paste is reduced to a very small quantity.

The trailing edge of an aircraft stabilizer surface according to the present invention comprises an upper skin and a lower skin, said skins being made of composite material. The trailing edge comprises a lightweight part that is assembled at an end section of the upper and lower skins.

The lightweight part is covered by a metallic sheet and has a "V"-shaped cross section with arms and a peak. The peak of the "V"-shaped cross section has a rounded shaped and is located opposite the end section of the upper and lower skins. The lightweight part connected to the end section of the upper and lower skins provides a continuous aerodynamic profile to the trailing edge.

The lightweight part of the trailing edge of an aircraft aerodynamic surface comprises a central hole, where the end section of the upper and lower skins is introduced, and inner holes.

The lightweight part is rigid and the inner holes comprised in said lightweight part reduce the weight of the lightweight part.

The material the part is made of, is polyamide 6/10 reinforced with fiberglass, in a percentage of 40%.

The union between the lightweight part and the upper and lower skins of the trailing edge is secured by means of a rivet.

The metallic sheet that covers the lightweight part is fastened to the lightweight part with an adhesive material, and offers a continuous external surface. The metallic sheet is made of is aluminum.

The lightweight part of the trailing edge comprises, at the top of the ends of each of the arms, two beveled corners preventing the contact between the metallic sheet and the upper skin, and the contact between the metallic sheet and the lower skin.

The trailing edge object of the invention corresponds to the trailing edge of a vertical rudder of an aircraft vertical stabilizer, or to the trailing edge of a horizontal elevator of an aircraft horizontal stabilizer, or to the trailing edge of a wing of an aircraft, or to the trailing edge of a flap of an aircraft, or to the trailing edge of an aileron of an aircraft.

BRIEF DESCRIPTION OF THE DRAWINGS

The invention will be better understood from reading the following detailed description, taken in conjunction with the drawings in which similar reference numbers are used to designate similar elements, and wherein.

Figure 1:
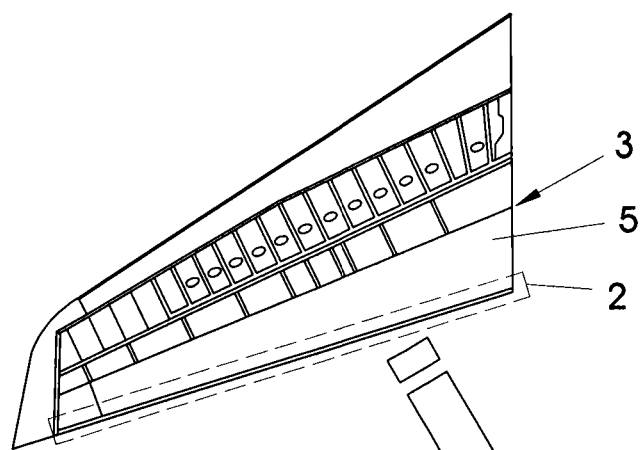
FIG. 1 shows a top view of a horizontal tail plane with the elevator area highlighted.

A list of reference numbers used in the drawings is given hereinafter:
- 1.—lightweight part,
- 2.—trailing edge,
- 3.—horizontal tail plane (HTP),
- 4.—paste,
- 5.—elevator,
- 6.—upper skin,
- 7.—lower skin,
- 8.—metallic sheet,
- 9.—inner holes,
- 10.—central hole,
- 11.—strip of sealing material,
- 12.—rivet,
- 13.—end section,
- 14.—adhesive material,
- 15.—"U"-shaped metallic sheet,
- 16.—corner.

DESCRIPTION OF A PREFERRED EMBODIMENT

The invention discloses a new trailing edge (2) of an aircraft aerodynamic surface comprising an upper skin (6), a lower skin (7) and a new lightweight part (1) to join the upper and lower skins (6, 7).

FIG. 1 shows a horizontal tail plane (HTP) (3) where the trailing edge (2) of an elevator (5) of said horizontal tail plane (HTP) (3) is highlighted.

Figure 2:
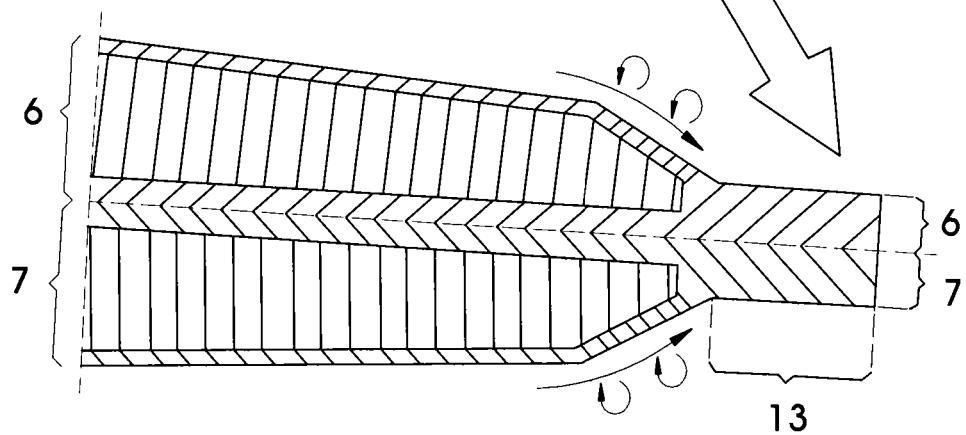
FIG. 2 shows a view of the profile of an elevator manufactured with sandwich type composite material.

FIG. 2 shows a view of a cross section of the trailing edge (2) of the elevator (5) of the HTP (3), where said trailing edge (2) is formed by the joint of the upper skin (6) and the lower skin (7).

Due to the minimum core thickness requirement for each of the skins which make up the trailing edge (2) of an aircraft elevator (5), there is a change in the slope of said upper and lower skins (6, 7), which worsens the aerodynamic profile of the trailing edge (2).

Figure 3:
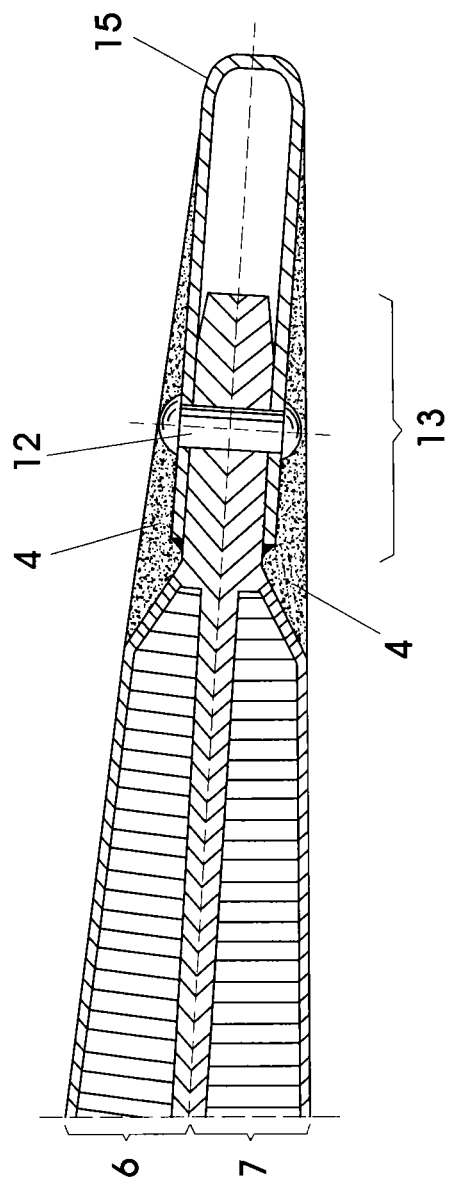
FIG. 3 shows a view of a stabilizer trailing edge structure according to the prior art.

FIG. 3 shows an elevator (5) trailing edge (2) structure currently used. Said structure comprises a "U"-shaped metallic sheet (15) fastened to the upper and lower skins (6, 7). A huge quantity of paste (4) is placed over the "U"-shaped metallic sheet (15) in order to provide continuity to the aerodynamic profile of the trailing edge (2). Said paste (4) covers the "U"-shaped metallic sheet (15) and a larger quantity thereof is used in the areas closest to the upper and lower skins (6, 7). An aerodynamic profile that does not increase the parasite drag is obtained with the paste (4) surrounding the "U"-shaped metallic sheet (15).

Figure 4:
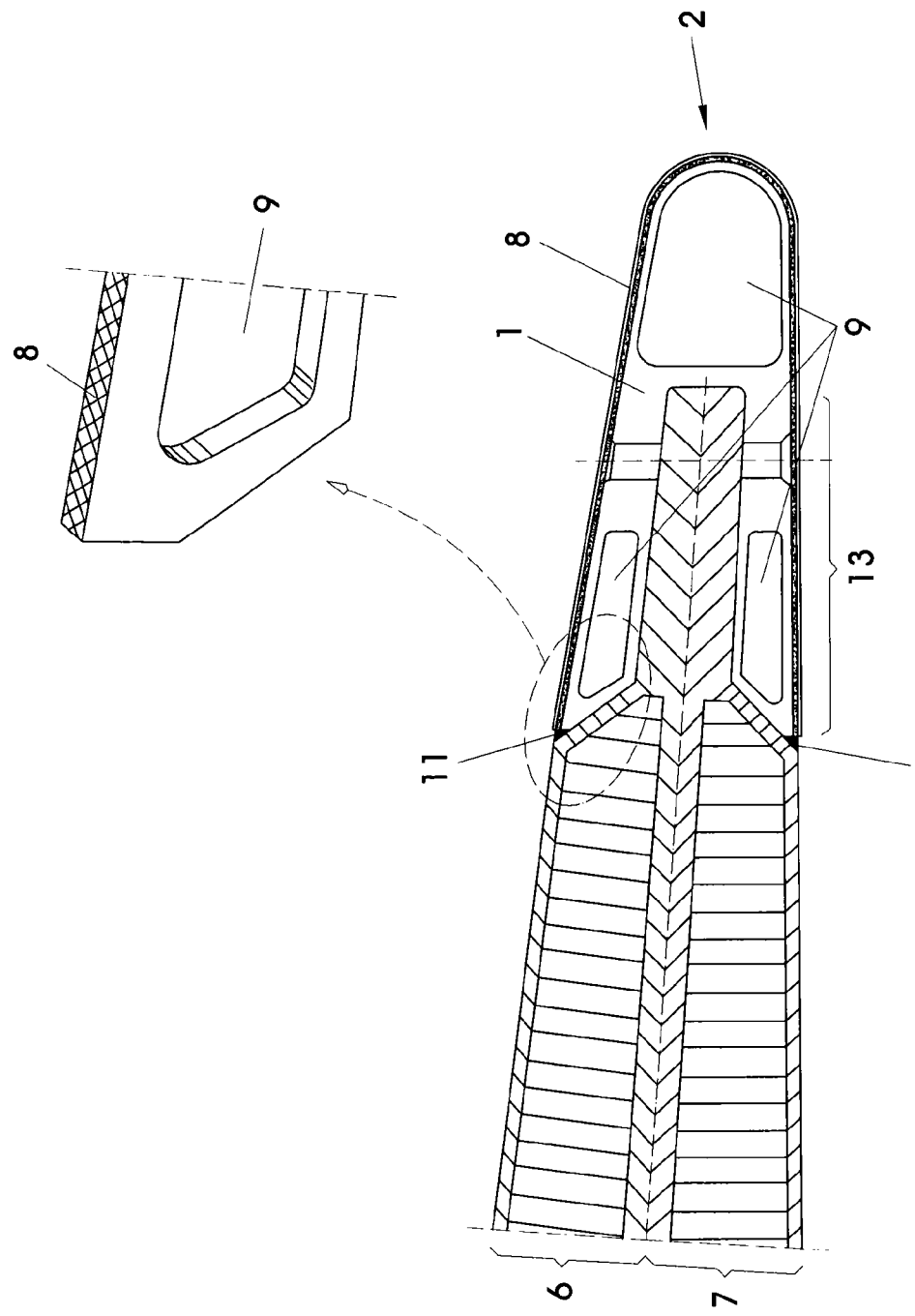
FIG. 4 shows a view of a cross section of the trailing edge of the current invention.

The trailing edge (2) object of the invention (as shown in FIG. 4) comprises:
  an upper skin (6) and a lower skin (7), as shown in FIG. 2,
  a lightweight part (1) connected to said upper and lower skins (7, 9), and
  a metallic sheet (8) covering said lightweight part (1).

Figure 5:
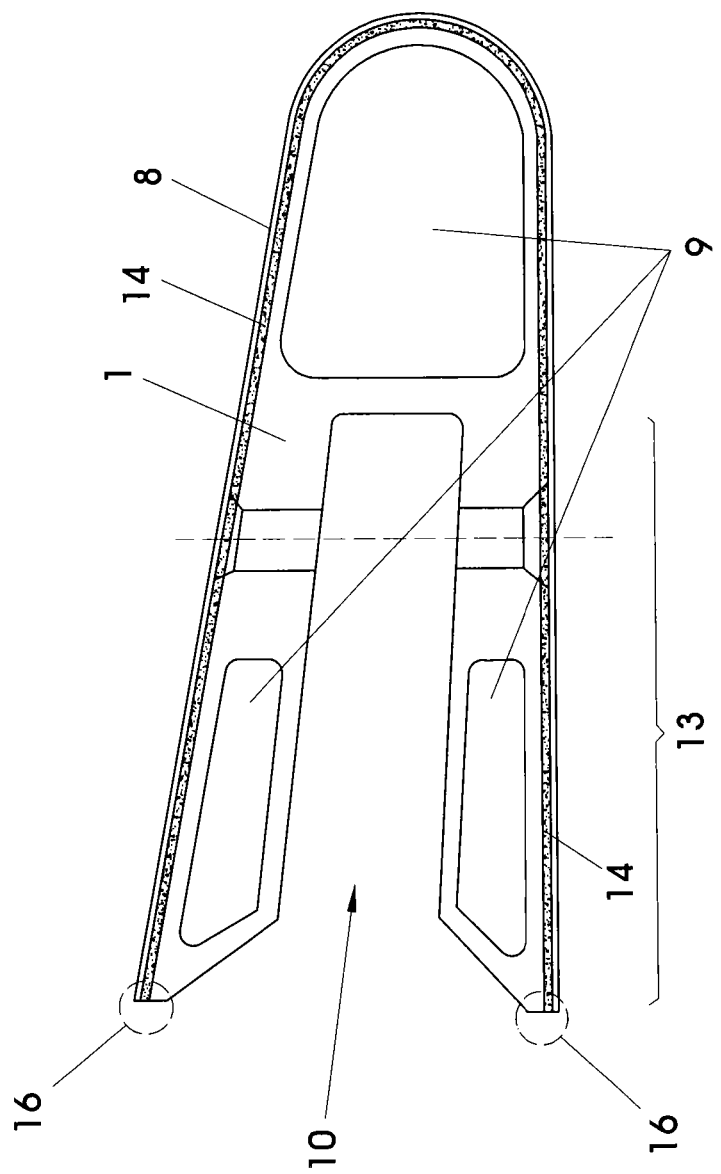
FIG. 5 shows a view of a cross section of a lightweight part covered by a metallic sheet according to the current invention.

The lightweight part (1) has a "V"-shaped cross section with a rounded peak and arms whose ends have beveled corners (16) as shown in FIG. 5.

The peak of the "V"-shaped cross section in the lightweight part (1) has a rounded shape to reduce the possibility of a boundary layer separation in the trailing edge (2) of the HTP (3) elevator (5).

The material the lightweight part (1) is made of, is composed of polyamide 6/10 reinforced with fiberglass in a percentage of 40%. This light material (and its mentioned percentage) meets the lightness and resistance requirements of a trailing edge (2) structure.

According to the preferred embodiment of the invention, the cross section of the lightweight part (1) comprises several inner holes (9).

The cross section of the lightweight part (1) also comprises a central hole (10), being said central hole (10) used to connect the lightweight part (1) to the upper and lower skins (6, 7). The connection of the lightweight part (1) and the upper and lower skins (6, 7) is carried out by inserting the end section (13) of the upper and lower skins (6, 7) in the central hole (10) of the lightweight part (1), said connection being secured by means of a rivet (12).

The lightweight part (1) of the trailing edge (2) is externally covered by a metallic sheet (8). Said metallic sheet (8) protects and strengthens the lightweight part (1) and has a continuous external surface that provides continuity to the outer surface of the trailing edge (2) and, in addition to these features, the metallic sheet (8) provides protection against lightning strike and it also provides a better aerodynamic surface.

The metallic sheet (8) covering the lightweight part (1) is fastened to the lightweight part (1) by means of an adhesive material (14).

The metallic sheet (8) does not enter into contact with the upper skin (6) or the lower skin (7) in order to avoid corrosion problems in said metallic sheet (8), furthermore, to ensure that the metallic sheet (8) does not contact the upper skin (6) or the lower skin (7), the corners (16) of the lightweight part (1) have a beveling.

The beveling of said corners (16) generates small gaps between the lightweight part (1) and the upper and lower skins (6, 7), said small gaps being filled with a strip of sealing material (11), as shown in FIG. 4.

The strip of sealing material (11) seals up the connection between the lightweight part (1) and the upper and lower skins (6, 7) and prevents dirt and moisture from entering the connection, and said strip of sealing material (11) avoids corrosion problems.

With the trailing edge (2) of the invention, the use of paste (4) is reduced to fill an extreme area that is generated between the head of the rivet (12) and the level of the metallic sheet (8). And as the use of the paste (4) is reduced to a very small quantity, the paste (4) does not fall off avoiding the appearance of the aforementioned drawbacks.

Although the entire prior assembly has been expressed as designed for the elevator (5) of the horizontal tail plane (3), the same design is used for the rudder of the vertical tail plane. This design is also used for the trailing edge (2) of a wing, for the trailing edge (2) of a flap and for the trailing edge (2) of an aileron.

The present invention should not be seen as limited to the particular embodiment described herein. Other shapes can be achieved by those skilled in the art in view of the present description. Accordingly, the scope of the invention is defined by the following claims.

The invention claimed is:

1. Trailing edge of an aircraft aerodynamic surface, comprising:
  an upper skin and a lower skin, said upper and lower skins each being made of composite material and together forming an end section of the upper and lower skins; and
  a lightweight part comprising a rigid structure having a plurality of inner holes configured to reduce weight of the lightweight part, the rigid structure being covered by a metallic sheet, wherein the lightweight part having a "V"-shaped cross section with arms and a peak, where the arms form a central hole configured to receive the end section of the upper and lower skins, and where the peak of the "V"-shaped cross section has a rounded shape and is located opposite the end section of the upper and lower skins, and wherein the upper skin, the lower skin and the lightweight part, providing a continuous aerodynamic profile to the trailing edge.

2. Trailing edge of an aircraft aerodynamic surface, according to claim 1, wherein the lightweight part is made of polyamide 6/10 reinforced with fiberglass.

3. Trailing edge of an aircraft aerodynamic surface, according to claim 2, wherein the percentage of fiberglass of the lightweight part is 40%.

4. Trailing edge of an aircraft aerodynamic surface, according to claim 2, wherein the lightweight part of the trailing edge comprises, at the ends of the arms, two beveled corners preventing the contact between the metallic sheet and the upper skin, and the contact between the metallic sheet and the lower skin.

5. Trailing edge of an aircraft aerodynamic surface, according to claim 1, wherein a union between the lightweight part and the upper and lower skins of the trailing edge is secured by means of a rivet.

6. Trailing edge of an aircraft aerodynamic surface, according to claim 5, wherein the lightweight part of the trailing edge comprises, at the ends of the arms, two beveled corners preventing the contact between the metallic sheet and the upper skin, and the contact between the metallic sheet and the lower skin.

7. Trailing edge of an aircraft aerodynamic surface, according to claim 1, wherein the metallic sheet, covering the lightweight part, is fastened to the lightweight part by means of an adhesive material.

8. Trailing edge of an aircraft aerodynamic surface, according to claim 7, wherein the metallic sheet covering the lightweight part, is made of aluminum.

9. Trailing edge of an aircraft aerodynamic surface, according to claim 8, wherein the metallic sheet covering the lightweight part offers a continuous external surface.

10. Trailing edge of an aircraft aerodynamic surface, according to claim 7, wherein the metallic sheet covering the lightweight part offers a continuous external surface.

11. Trailing edge of an aircraft aerodynamic surface, according to any previous claim 1, wherein the lightweight part of the trailing edge comprises, at the ends of the arms, two beveled corners preventing the contact between the metallic sheet and the upper skin, and the contact between the metallic sheet and the lower skin.

12. Trailing edge of an aircraft aerodynamic surface, according to claim 11, wherein the lightweight part is made of polyamide 6/10 reinforced with fiberglass.

13. Trailing edge of an aircraft aerodynamic surface, according to claim 11, wherein a union between the lightweight part and the upper and lower skins of the trailing edge is secured by means of a rivet.

14. Trailing edge of an aircraft aerodynamic surface, according to claim 11, wherein the metallic sheet covering the lightweight part, is fastened to the lightweight part by means of an adhesive material.

15. Trailing edge of an aircraft aerodynamic surface, according to claim 1, wherein the trailing edge is a trailing edge of a vertical rudder of an aircraft vertical stabilizer.

16. Trailing edge of an aircraft aerodynamic surface, according to claim 1, wherein the trailing edge is a trailing edge of a horizontal elevator of an aircraft horizontal stabilizer.

17. Trailing edge of an aircraft aerodynamic surface, according to claim 1, wherein the trailing edge is a trailing edge of a wing of an aircraft.

18. Trailing edge of an aircraft aerodynamic surface, according to claim 1, wherein the trailing edge is a trailing edge of a flap of an aircraft.

19. Trailing edge of an aircraft aerodynamic surface, according to claim 1, wherein the trailing edge is a trailing edge of an aileron of an aircraft.

\* \* \* \* \*